March 4, 1930.  H. R. BOALS  1,749,016
METHOD OF AND APPARATUS FOR MAKING TUBING
Filed Dec. 8, 1927  2 Sheets-Sheet 1

INVENTOR
Harry R. Boals.
BY
ATTORNEYS.

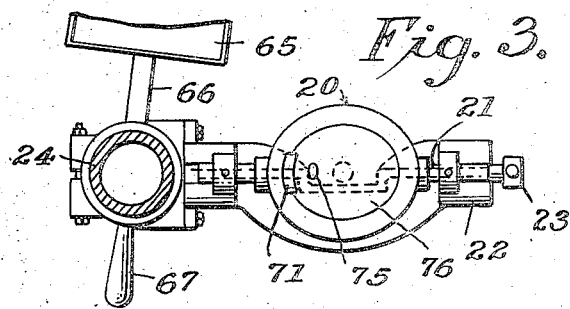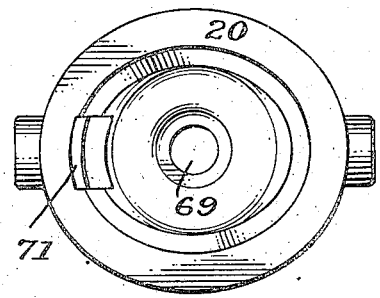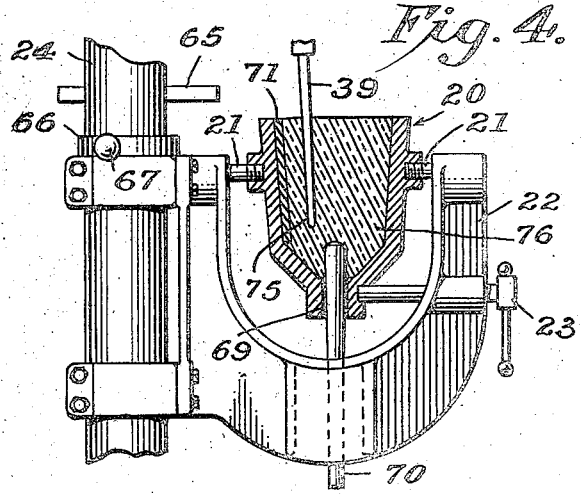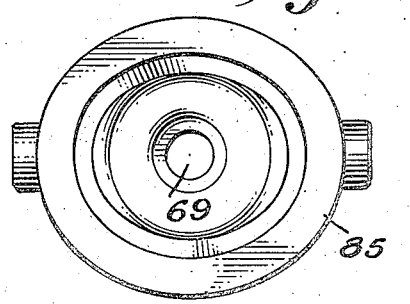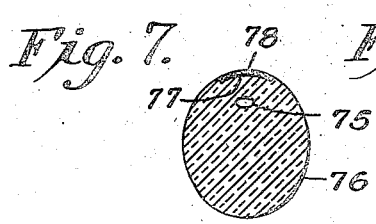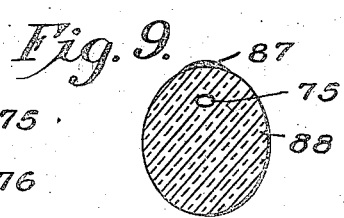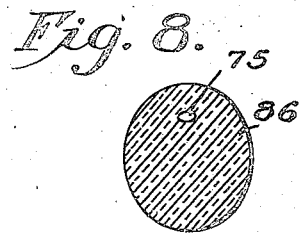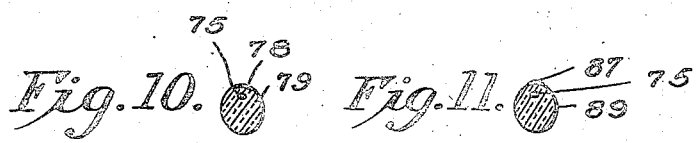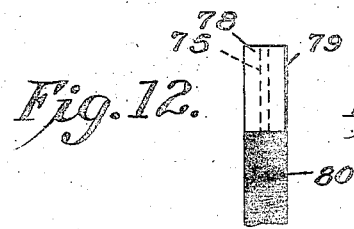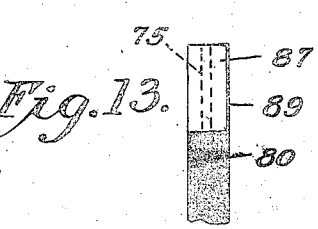

Patented Mar. 4, 1930

1,749,016

UNITED STATES PATENT OFFICE

HARRY R. BOALS, OF CORNING, NEW YORK, ASSIGNOR TO CORNING GLASS WORKS, OF CORNING, NEW YORK, A CORPORATION OF NEW YORK

METHOD OF AND APPARATUS FOR MAKING TUBING

Application filed December 8, 1927. Serial No. 238,565.

This invention relates to the art of tubing, and more particularly to tubing intended for receiving an indicating fluid.

It has long been recognized that thermometers, and especially clinical thermometers, are difficult to read owing to their failure to magnify the indicating fluid sufficiently, but prior to the present invention there has been no way of producing tubing on a commercial scale which satisfactorily overcomes this objection.

I have discovered that tubing having any desired degree of magnification, and of any desired shape or type, can be made commercially by forming a mold having a cross-section and depth similar to that of the desired blank, filling this mold with molten glass, forming a bore therein, removing said blank from the mold, and drawing it in the usual manner.

It is therefore an object of this invention to provide a new and improved method of making thermometer tubing and a suitable apparatus for use therein.

It is a further object of this invention to provide a mold having the shape and size of the desired blank and means for forming a bore of the desired shape and size at a predetermined position in said blank.

With the above and other objects in view, which will be apparent as the description proceeds, I have described my invention in the following specification and illustrated the same in the accompanying drawings, in which:

Fig. 3 is a horizontal section of my improved apparatus, on an enlarged scale, taken on the line 3—3 of Fig. 1, but showing the cover plate swung outwardly;

Fig. 4 is a side elevation, on the scale of Fig. 3, with the mold shown in section, and the plunger in operating position in the glass in the mold;

Fig. 5 is a plan view, on a further enlarged scale, of the mold shown in Figs. 1–4;

Fig. 6 is a plan view of a modified shape of mold;

Fig. 7 is a transverse section through a blank formed in the apparatus shown in Figs. 1–4, but showing the blank after a light shield has been added thereto;

Fig. 8 is a transverse section through a blank formed in the mold shown in Fig. 6;

Fig. 9 is a transverse section through a blank formed in the mold shown in Fig. 6, but showing the blank after a light shield has been added thereto;

Fig. 10 is a transverse section, on an enlarged scale, through a piece of finished tubing formed from a blank like that shown in Fig. 7;

Fig. 11 is a transverse section, on the scale of Fig. 10, through a piece of finished tubing formed from a blank like that shown in Fig. 9;

Fig. 13 is an elevational view of the finished tubing shown in Fig. 10, with an indicating fluid in the bore;

Fig. 13 is an elevational vew of the finished tubing shown in Fig. 11, with an indicating fluid in the bore.

Figure 1:
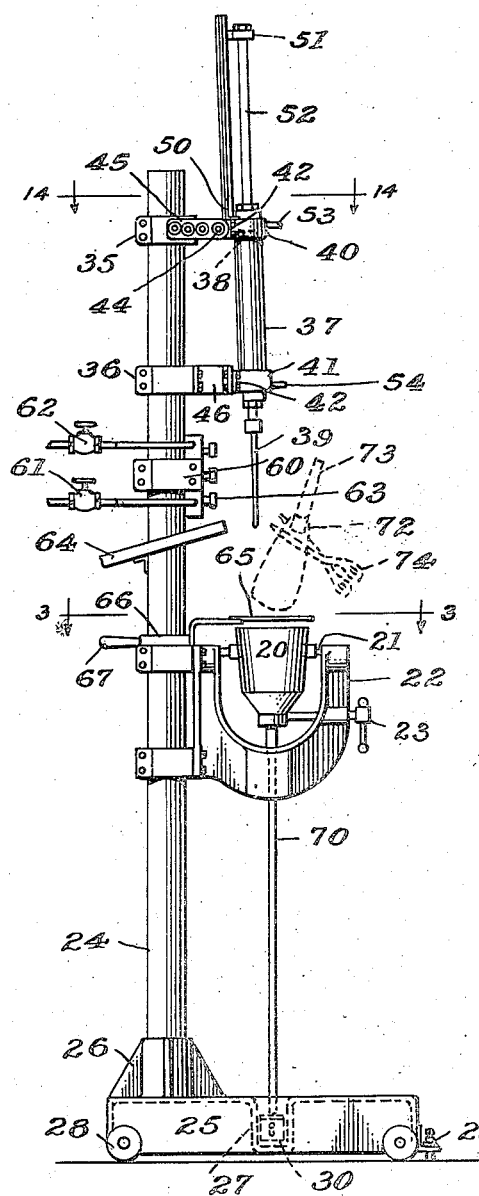
Fig. 1 is a side elevation of my improved apparatus.

As shown in the accompanying drawings, and referring first to Figs. 1–4, I have illustrated therein a mold 20 of a shape to be more fully described hereinafter, said mold being provided with trunnions 21 for supporting it in a bracket 22, and with a locking device 23 for holding it in the desired operating position. As also shown in these figures, the bracket is mounted on a rod 24 supported in a suitable base 25. The latter is preferably a hollow casting which is provided with an integral bracket 26 to support the rod 24, a slot 27 extending inwardly from one side to receive the end of a punty to be described later, rollers 28 to facilitate movement of the apparatus from place to place, a stop bolt 29 for anchoring the apparatus in a desired position, and an adjustable stop 30 for supporting the end of the punty.

Figure 2:
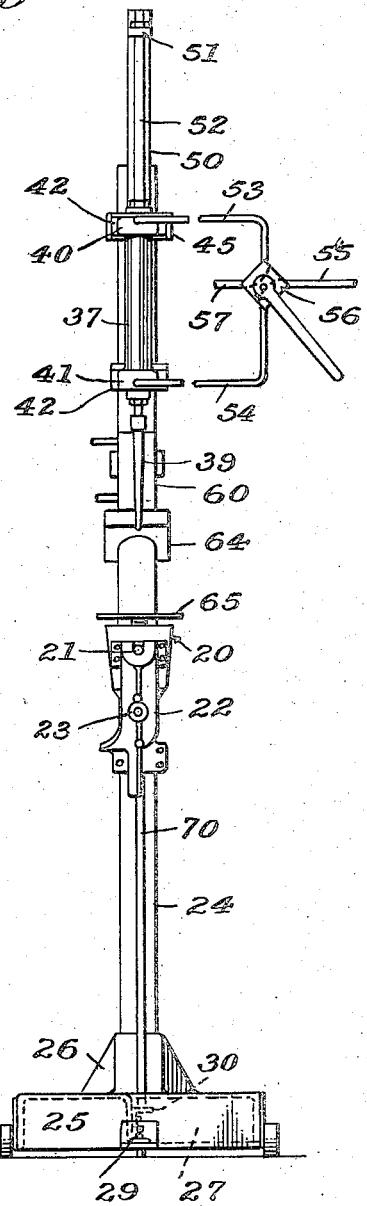
Fig. 2 is a front elevation thereof.
Figure 14:
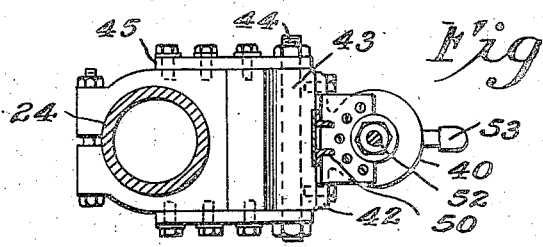
Fig. 14 is a horizontal section on the line 14—14 of Fig. 1.

Mounted on rod 24, by upper and lower brackets 35 and 36, is a cylinder 37 provided with a piston 38, the lower end of the latter removably supporting a plunger 39. As shown in Figs. 1 and 2, cylinder 37 is provided with upper and lower cylinder heads 40 and 41 which are flanged at 42, and these flanges are perforated to facilitate their attachment to supporting parts. The upper cylinder head 40 has its flange 42 bolted to a pivot block 43 (Fig. 14) which is pivotally mounted on a pin 44, the latter being carried by bracket arms 45 that are in turn bolted to the upper bracket 35. The lower bracket 36 has removable bracket arms 46 to which the lower cylinder head 41 is bolted. Bracket arms 46 of varying lengths are provided in order to permit the mounting of cylinder 37 at any desired angle to supporting rod 24, with its lower end rigidly supported.

A plunger guide bracket 50 is bolted to the upper cylinder head 40 and has a guide 51 which moves up and down in a recess in the guide bracket to support the piston rod 52 (Fig. 1) and prevent it from rotating when it is reciprocated into and out of cylinder 37.

While the plunger 39 may be operated in any desired manner, this is preferably done by compressed air supplied through hose connections 53 and 54 leading from a suitable compressed air supply line 55, and controlled by any suitable valve, such as the four-way valve 56, one of the connections to the latter serving as a common exhaust 57 for both ends of the cylinder.

As best shown in Fig. 1, I prefer to provide a water spray 60 for cooling the plunger at predetermined times, as described later, by the opening and closing of an air valve 61 which controls the discharge of a predetermined mixture of air and water. This may be done by hand, as indicated herein, or if desired it may be done automatically by the reciprocation of the plunger 39.

In the preferred form of my invention the spray consists mainly of moistened air, the discharge of the water being regulated by a valve 62 which is preferably set to allow the water to drip at a slow rate, substantially none of the mixture being discharged during the period that the plunger is being lowered into or is being withdrawn from the mold 20 because the air is shut off during that period. When the air valve 61 is turned on, however, the spray issues from one or more nozzles 63 and plays on the plunger 39. Any slight drip which may occur during the periods the spray is supposed to be inactive is collected in a chute 64 which carries away this moisture to any desired point.

A cover plate 65, carried on a bracket 66 and provided with an operating handle 67, is supported on the plunger supporting rod 24 by the top of bracket 22.

Referring particularly to Figs. 3 and 4 it will be seen that the mold 20 illustrated therein is of elliptical cross-section, the walls of said mold tapering from its top to its bottom portion, and the latter having a central opening 69 adapted to receive a punty 70. The mold is also preferably provided with a rib 71 which extends inwardly from top to bottom of one end of the mold to form a recess of predetermined size and shape in the resulting glass blank. Rib 71 may be integral with the mold 20 or may be secured thereto in any convenient manner.

When it is desired to form tubing by my new method, and by the use of the apparatus illustrated herein, the end of a punty 70 is heated and the punty is inserted in the mold 20. The operator then gathers molten glass 72 on the end of a punty 73 and holds the latter over the opening in the top of the mold 20, as shown in dotted lines in Fig. 1. After the glass 72 sags down into the mold 20 the operator cuts off the tail adhering to the punty, using a pair of shears 74. An additional mass or masses of glass is then dropped into the mold in a similar manner until the latter is substantially filled. Valve 56, that controls the operation of the plunger cylinder 37 and propels the plunger 39 into the glass in the mold, is then operated, allowing the plunger to remain in the mold for as long a period as is safe, depending on the size of the plunger and the amount of glass in the mold. By a further manipulation of the valve 56 the plunger is withdrawn before it has been heated sufficiently to cause it to adhere to the glass. The cover plate 65 is then moved into position over the top of the mold and the water spray 60 is turned on to cool the plunger 39. The latter is then wiped off with a piece of waste or other suitable material, the plate is swung outwardly so as to uncover the top of the mold, and the plunger is again reciprocated into and out of the glass. This sequence of operations is continued until the glass in the mold has cooled sufficiently to enable the bore 75, which is thus formed in the glass, to hold its shape. The operator then swings the mold 20 on its trunnions 21 by pulling upwardly on the lower end of the punty 70, and the mass or blank of glass 76 in the mold, adhering to the end of the punty which is exposed in the mold, is then forced outwardly from the mold by pushing it upwardly with the punty. After removing the blank 76 from the mold the operator then fills the cavity 77 formed in one end of the blank with glass of some other type, such as the white enamel glass 78 which is customarily used to form the light shield in thermometer tubing, by dropping said white enamel into the cavity and cutting it off from the punty on which it was gathered. The white enamel is then smoothed on the blank, to facilitate its positioning in the cavity 77, and the blank is then put into a reheater furnace to bring it to the proper temperature for drawing, after which it is drawn in the regular manner to form tubing 79 such as is shown in Figs. 10 and 12. An indicating fluid 80 placed in the bore 75 of this shape of tubing will be magnified so that it fills the entire front surface of the tubing 79 when viewed from the opposite side of the tubing from that which contains the bore 75.

In Fig. 6 I have shown a modified mold 85 which differs from the mold 20 shown in Figs. 1–5 only in that the rib 71 shown in mold 20 is omitted from the mold 85. This results in the formation of a blank 86, shown in Fig. 8. Where a light shield 87 is desired with a blank made in this manner it can be applied in the way in which a light shield is applied in the ordinary method of making thermometer tubing, namely, by spreading it along one side of the blank and smoothing it down, thus forming a blank 88 of the type shown in Fig. 9. This is reheated and drawn into tubing 89 in the usual manner. With this exception, tubing of the type shown in Figs. 11 and 13 is formed in the same manner as that shown in Figs. 10 and 12.

It will be obvious that the molds 20 and 85 may be given any cross-sectional shape desired and will result in the formation of tubing having a corresponding shape, although I prefer to make the molds of elliptical cross-section, inasmuch as elliptical tubing provided with a bore placed at the rear focus, gives the maximum magnification of the indicating fluid placed in said bore when said fluid is viewed from the opposite side of said tubing. When forming such tubing the plunger 39 is so mounted and inclined, with respect to the rod 24, that the path it traverses through the mold is immediately behind the locus of the corresponding foci of the ellipses formed by successive planes through the glass in the mold, when said planes are parallel to the top of the mold.

By experiment it has been found that the ellipticity of the glass changes on drawing and that the mold should be made with about one-half of the ellipticity of the finished product. For a glass having an index of refraction of 1.54, the ratio of the major to the minor axis of the mold should be 1.14 to give the correct ellipse shape to the tubing, namely, one having a ratio of major to minor axis of 1.31.

When other shapes of tubing are being manufactured the position of the plunger will be altered so it will occupy the proper position for forming the bore in the desired location according to the shape of tubing being made.

It will also be apparent that if clinical tubing is desired the plunger 39 and bore 75, as shown herein, will be of relatively small size as compared with the corresponding cross-section of the mold. Where motometer tubing, the so-called commercial tubing, or incubator tubing is desired, the size and shape of the plunger 39 and consequently of the bore 75 will be increased and altered in shape accordingly.

Likewise, although I have referred to the glass 78 which is inserted in the cavity 77 of blank 76 (Fig. 7), and the glass 87 applied to the back of the blank 86 (Fig. 8) to form the blank 88 (Fig. 9) as being a white enamel glass to form a light shield, it will be obvious that any other desired glass could be substituted therefor in case a special type of tubing was desired. Furthermore, if desired, one or more colored stripes (not shown) could be applied to the blank before the light shield was applied thereto and thus secure striped tubing of different types.

Although I have herein shown a water spray as the means for cooling the plunger between its reciprocations, any other suitable cooling means could be used, and this could be operated automatically if desired. The amount of cooling water used in such a spray is small and ordinarily does not need any special conduit for removing same, but if desired a suitable drain pan could be provided.

In making tubing having a small bore it is preferable to allow the plunger to remain in the glass a shorter time than when making tubing with a larger bore, as it prevents damage to the plunger. In making such smaller tubing, however, the number of reciprocations of the plunger is correspondingly increased. I have found that about eight reciprocations of the plunger will produce a satisfactory result in the manufacture of clinical tubing, and from five to seven reciprocations are sufficient for the production of tubing having a larger bore.

It will therefore be apparent that I have produced a new and useful apparatus for the manufacture of tubing in quantity production and a new method of forming said tubing, and I do not desire to be limited to the specific construction shown and described herein except as indicated by the scope of the following claims.

I claim:

1. An apparatus for shaping tube blanks comprising a base, a standard thereon, a mold supporting yoke on the standard, a trunnioned mold removably supported in said yoke, said mold having a punty receiving opening in its bottom wall and a lock in vertical alignment with the opening in the mold bottom for engaging the handle of a punty when the same is in position in the mold to prevent the mold from turning in the yoke.

2. In an apparatus for shaping tube blanks, a base, a standard thereon, a yoke supported on the standard, a mold pivotally mounted in the yoke, said mold having a punty receiving opening in its bottom wall, a punty extending through said opening with its moil end disposed within the mold, means on the base for engaging the handle end of the punty to prevent accidental movement of the mold and a reciprocating plunger carried by the standard above the mold and adapted to be projected into the mold.

3. The method of making tubing which includes charging a mold, whose cross-section is similar to that of the desired tubing, with molten glass, forming a hole in said mass of glass in the relative position which it is desired to have the bore occupy in the finished tubing by reciprocating a plunger thereinto, cooling the plunger between its reciprocating movements, and drawing the blank thus formed into tubing of the desired cross-section.

4. Apparatus for making tubing blanks which includes a mold, a plunger, means for reciprocating the plunger into and out of the mold to form the bore of the tubing and means for cooling the plunger between its reciprocating movements.

5. Apparatus for making tubing blanks which includes a mold, a plunger, means for reciprocating the plunger into and out of the mold to form the bore of the tubing, and means for adjusting the angular position of the plunger relative to the mold to enable the bore to be formed in the desired position.

6. Apparatus for making tubing blanks which includes a mold that is elliptical in transverse cross-section to form a blank having a lens front, an internal rib in the mold to form a recess in the surface of the blank opposite the lens front and a plunger arranged to enter the mold between said rib and the lens front.

7. A mold for making tubing blanks which includes a hollow body that is elliptical in transverse cross-section at any point but which tapers from top to bottom, said mold being open at the top and closed at the bottom but being provided with a perforation through the bottom for receiving a punty, said mold also being provided with trunnions which permit it to tip for removal of the glass by lifting the punty.

HARRY R. BOALS.